US012005735B2

(12) United States Patent
Cooper et al.

(10) Patent No.: US 12,005,735 B2
(45) Date of Patent: Jun. 11, 2024

(54) WHEELCHAIR FOR SPECIALIZED SPORTS APPLICATIONS

(71) Applicants: United States Government as Represented by the Department of Veterans Affairs, Washington, DC (US); University of Pittsburgh-Of the Commonwealth System of Higher Education, Pittsburgh, PA (US)

(72) Inventors: Rory Cooper, Pittsburgh, PA (US); Jonathan Duvall, Pittsburgh, PA (US); Robert McDonough, Grove City, PA (US); Aaron Tyler Anderson, Philadelphia, PA (US); Siew Seang Ong, Singapore (SG); Jeffrey Ruffing, Pittsburgh, PA (US)

(73) Assignees: United States Government As Represented By The Department Of Veterans Affairs, Washington, DC (US); University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 503 days.

(21) Appl. No.: 17/200,324

(22) Filed: Mar. 12, 2021

(65) Prior Publication Data

US 2021/0283952 A1 Sep. 16, 2021

Related U.S. Application Data

(60) Provisional application No. 62/989,958, filed on Mar. 16, 2020.

(51) Int. Cl.
*B60B 33/00* (2006.01)
*A61G 5/10* (2006.01)
*B60B 33/02* (2006.01)

(52) U.S. Cl.
CPC ............ *B60B 33/0068* (2013.01); *A61G 5/10* (2013.01); *A61G 5/1051* (2016.11);
(Continued)

(58) Field of Classification Search
CPC ...... A61G 5/1051; A61G 5/10; A61G 5/1059; B60B 33/0039; B60B 33/025; B60B 33/02
See application file for complete search history.

(56) References Cited

U.S. PATENT DOCUMENTS 6,540,250 B1 * 4/2003 Peterson ................ A61G 5/125
297/DIG. 10
10,828,213 B1 * 11/2020 Ludovici .............. A61G 5/1054
(Continued)

FOREIGN PATENT DOCUMENTS

WO   WO-0182855 A2 * 11/2001 ........... A61G 5/1054
WO   WO-0185533 A1 * 11/2001 ............... A61G 5/08
(Continued)

*Primary Examiner* — Minnah L Seoh
*Assistant Examiner* — Ryan Edward Hardy
(74) *Attorney, Agent, or Firm* — Ballard Spahr LLP

(57) ABSTRACT

A wheelchair can comprise: a frame comprising an upper portion and a lower portion that is coupled to the upper portion so that the upper portion is vertically adjustable with respect to the lower portion. A pair of drive wheels can be coupled to the frame. A plurality (e.g., a pair) of casters are coupled to the frame. Each caster can have a respective swivel axis. At least one caster of the plurality of casters can be configured to be locked to prevent swiveling about its respective swivel axis and unlocked to enable swiveling about its respective swivel axis.

19 Claims, 7 Drawing Sheets

(52) U.S. Cl.
CPC ........ *A61G 5/1059* (2013.01); *B60B 33/0039* (2013.01); *B60B 33/0049* (2013.01); *B60B 33/025* (2013.01)

(56) References Cited

U.S. PATENT DOCUMENTS

| | | | | |
|---|---|---|---|---|
| 2004/0075237 | A1* | 4/2004 | Beck | A61G 5/1059 |
| | | | | 280/250.1 |
| 2011/0162166 | A1* | 7/2011 | Cooper | B60B 33/0021 |
| | | | | 16/45 |
| 2015/0375565 | A1* | 12/2015 | Beatty | B60B 33/021 |
| | | | | 16/35 R |
| 2019/0133856 | A1* | 5/2019 | Dowding | A61G 5/1059 |
| 2019/0314228 | A1* | 10/2019 | Horacek | A61G 5/0891 |
| 2019/0380895 | A1* | 12/2019 | Bryant | A61G 5/104 |
| 2020/0306113 | A1* | 10/2020 | MayField | A61G 5/1048 |
| 2020/0405552 | A1* | 12/2020 | Yoon | A61G 5/1002 |
| 2021/0205158 | A1* | 7/2021 | Brown | A61F 5/3792 |

FOREIGN PATENT DOCUMENTS

| | | | | |
|---|---|---|---|---|
| WO | WO-2012073222 A1 * | 6/2012 | | A61G 5/10 |
| WO | WO-2013041201 A1 * | 3/2013 | | A61G 5/02 |

* cited by examiner

WHEELCHAIR FOR SPECIALIZED SPORTS APPLICATIONS

CROSS-REFERENCE TO RELATED APPLICATION

This application claims priority to and the benefit of the filing date of U.S. Provisional Patent Application No. 62/989,958, filed Mar. 16, 2020, which is incorporated herein by reference in its entirety.

FIELD

The application relates to wheelchairs and, in particular, to wheelchairs that are configurable for sports applications, such as table tennis.

BACKGROUND

Conventional wheelchairs have two large rear wheels with push rims attached thereto. These wheelchairs have swivel casters on the front of the wheelchair to enable the wheelchair to change direction. The seat height and angle of conventional wheelchairs are limited to configurations that are comfortable and ergonomic for daily tasks. Such configurations are not optimal for all activities, such as, for example, table tennis (i.e., ping pong) and other sports or athletic activities.

Para table tennis is a Paralympic sport in which athletes compete in table tennis while using a wheelchair. Many Paralympic Sports are "technical" and rely on specialized sports equipment. The ability of the equipment to be customized for each sport has a strong influence on performance. Well-designed adaptive sports equipment not only optimizes the athlete's performance, but also reduces the risk of repetitive injury and pressure injury.

Currently, pant table tennis players use their day-to-day chair in game. Other conventional adaptive wheelchairs, including rugby wheelchairs, basketball wheelchairs, and tennis wheelchairs, are not optimized for playing table tennis, due to the unique needs and skills required when playing table tennis. Further, such adaptive wheelchairs may be suited for one or two sports, but none is flexible enough to cover a wide range of sports.

SUMMARY

Described herein, in various aspects, is a wheelchair that can optionally be used in specialized sports applications, including, for example and without limitation, table tennis.

A wheelchair can comprise a frame comprising an upper portion and a lower portion that is coupled to the upper portion so that the upper portion is vertically adjustable with respect to the lower portion. A pair of drive wheels can be coupled to the frame. A plurality of casters can be coupled to the frame. Each caster can have a respective swivel axis. At least one caster of the plurality of casters can be configured to be locked to prevent swiveling about its respective swivel axis and unlocked to enable swiveling about its respective swivel axis.

The at least one caster can comprise a fixed portion and a swivel portion that is selectively pivotable with respect to the fixed portion about the respective swivel axis. The fixed portion and the swivel portion can each define at least one spline. A locking collar can be slidable along the swivel axis between a first position and a second position. The locking collar can define an internal groove that is configured to receive therein a respective spline of the at least one spline of the fixed portion and a respective spline of the at least one spline of the swivel portion. When the at least one spline of the swivel portion of the at least one caster is aligned with the internal groove of the locking collar, the locking collar can be configured to move from the first position to the second position. When in the second position, the locking collar can be configured to inhibit pivoting of the swivel portion of the at least one caster with respect to the fixed portion of the at least one ono castor.

When in the second position, the locking collar can extend across an intersection between the fixed portion and the swivel portion of the at least one caster.

The at least one caster can further comprise at least one magnet that is configured to retain the locking collar in at least one of the first position or the second position.

The fixed portion of the at least one caster can comprise a flange that houses at least one of the at least one magnet.

The frame can comprise at least one threaded rod end extending between the upper portion and the lower portion of the frame. The at least one threaded rod end can define at least one thread and a transverse through-hole. One of the upper portion and the lower portion of the frame can define a female thread that receives the at least one thread of the at least One threaded rod end and the other of the upper portion and the lower portion of the frame couples to the threaded rod end via the transverse through-hole.

The at least one threaded rod end can comprise four threaded rod ends.

A respective bolt can extend through the transverse through-hole of each one of the at least one rod end and couples to the lower portion of the frame.

A respective clamp can couple to the lower portion of the frame and receive the respective bolt therethrough.

A seat can be coupled to the frame.

The upper portion of the frame can be adjustable with respect to the lower portion of the frame to position the seat at least 17 inches above the ground.

The wheelchair can be configured to position the seat at least 20 inches above the ground.

The seat can define an angular tilt between the front edge and the rear edge. The wheelchair can be configured to enable a forward tilt of at least eighteen degrees.

The wheelchair can be configured to enable a rearward tilt of at least eighteen degrees.

The wheelchair can further comprise a pushrim coupled to the drive wheels so that rotation of the pushrim causes corresponding rotation of the drive wheels.

The upper portion of the frame can be adjustably coupled to the lower portion of the frame at a selectable position along a horizontal axis extending between a front and a rear of the wheelchair.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF THE DRAWINGS

These and other features of the preferred embodiments of the invention will become more apparent in the detailed description in which reference is made to the appended drawings Wherein.

DETAILED DESCRIPTION

Figure 1:
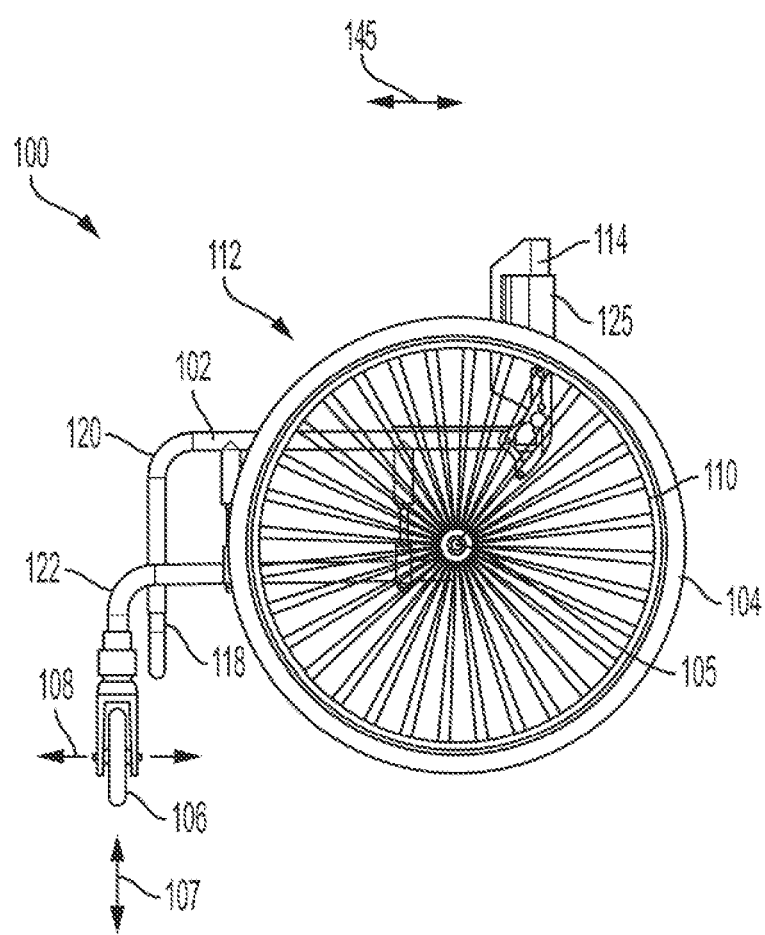
FIG. 1 is a side view of a wheelchair in accordance with embodiments disclosed herein.

The present invention now be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a," "an," and "the" include plural referents unless the context clearly dictates otherwise. For example, use of the term "a wheel" can refer to one or more of such wheels, and so forth.

All technical and scientific terms used herein have the same meaning as commonly understood to one of ordinary skill in the art to which this invention belongs unless clearly indicated otherwise.

As used herein, the terms "optional" or "optionally" mean that the subsequently described event or circumstance may or may not occur, and that the description includes instances where said event or circumstance occurs and instances where it does not.

As used herein, the term "at least one of" is intended to be synonymous with "one or more of." For example, "at least one of A, B and C" explicitly includes only A, only B, only C, and combinations of each.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Optionally, in some aspects, when values are approximated by use of the antecedent "about," it is contemplated that values within up to 15%, up to 10%, up to 5%, or up to 1% (above or below) of the particularly stated value can be included within the scope of those aspects.

The word "or" as used herein means any one member of a particular list and also includes any combination of members of that list.

It is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

The following description supplies specific details in order to provide a thorough understanding. Nevertheless, the skilled artisan would understand that the apparatus, system, and associated methods of using the apparatus can be implemented and used without employing these specific details. Indeed, the apparatus, system, and associated methods can be placed into practice by modifying the illustrated apparatus, system, and associated methods and can be used in conjunction with any other apparatus and techniques conventionally used in the industry.

Figure 2:
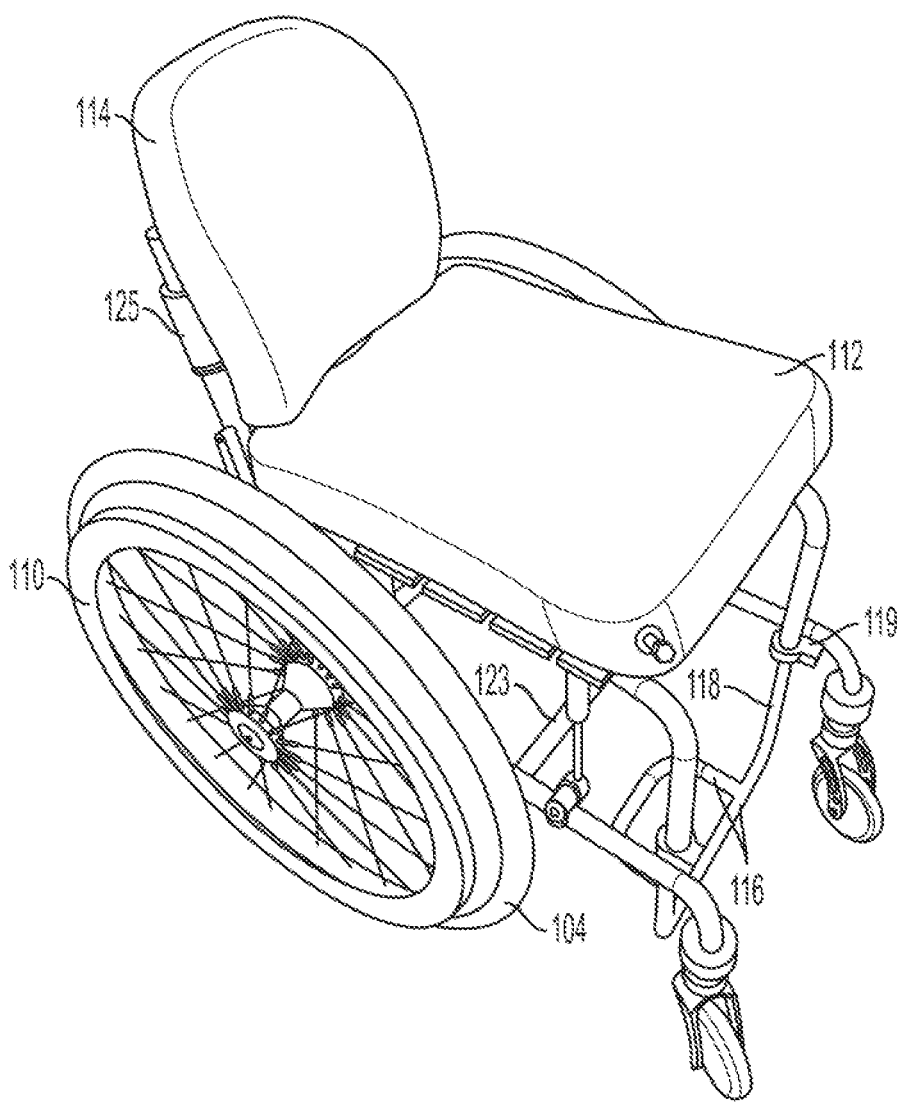
FIG. 2 is a perspective view of the wheelchair as in FIG. 1.

Disclosed herein, and with reference to FIGS. 1 and 2, is a wheelchair 100. The wheelchair 100 can comprise features that make it suitable for using when playing table tennis. Although the present disclosure is largely directed to the wheelchair's use when playing table tennis, it should be understood that the wheelchair 100, and aspects thereof, can be desirably used in various spotting events (games, matches, etc.), including, for example, and without limitation, a basketball game, a tennis match, a rugby match, billiards, bocce, archery, shooting, wheelchair dance, and the like. Further, it will be apparent that one embodiment of the wheelchair 100 can be adapted (i.e., selectively adjusted as further disclosed herein) for use in multiple different activities (e.g., table tennis and basketball).

The wheelchair 100 can comprise a frame 102 and a pair of rear drive wheels 104 rotatably attached to the frame about respective (optionally, collinear) axes of rotation 105. A pushrim 110 can couple to the wheels 104 for enabling a user to propel the wheelchair. A plurality (e.g., a pair) of casters 106 can couple to the front of the frame 102. The casters 106 can each have respective swivel axes 107 and rotational axes 108. The frame can support a seat 112 and a backrest 114. The wheelchair 100 can comprise a footrest 116. Optionally, the vertical spacing between the seat and the footrest can be adjustable. For example, the frame 102 can telescopically receive parallel support members 118 that extend between the footrest 116 and portions of the frame 102 that support the seat 112. Clamps 119 can lock to fix the position of the support members 118 and, thus, the spacing between the seat 112 and the footrest 116.

Figure 3:
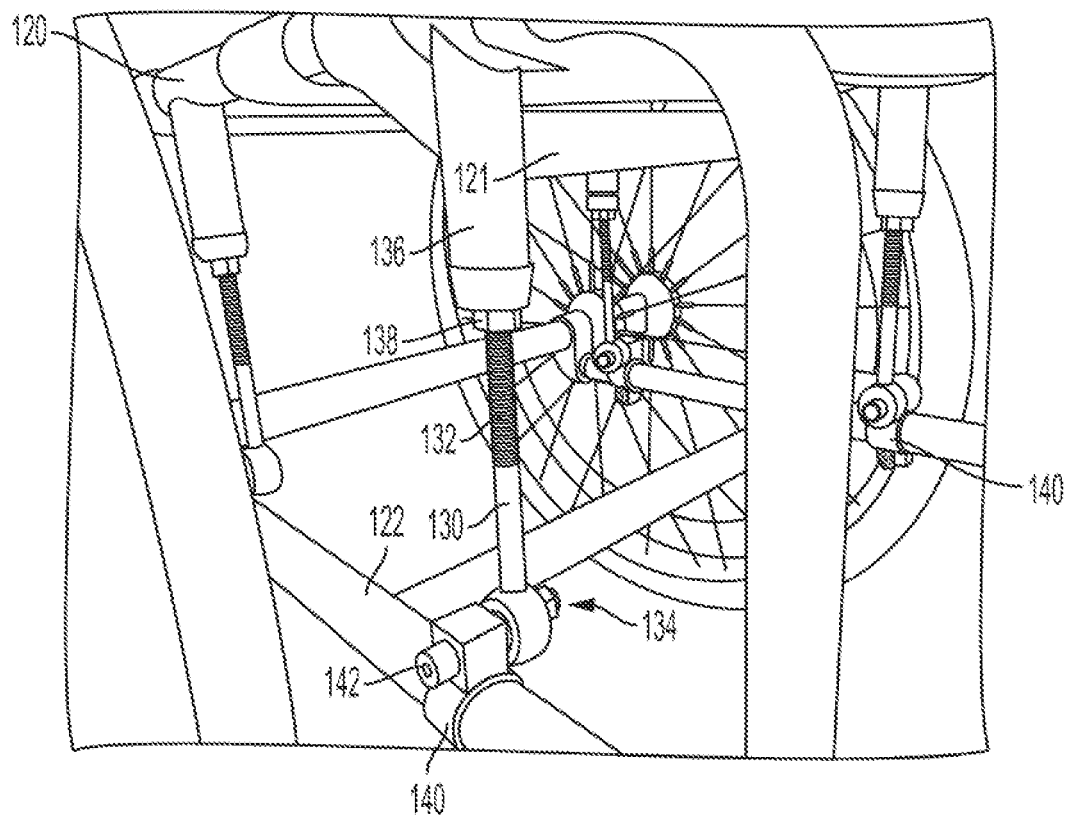
FIG. 3 is a partial perspective view of the wheelchair as in FIG. 1, illustrating the frame and adjustment hardware.
Figure 4:
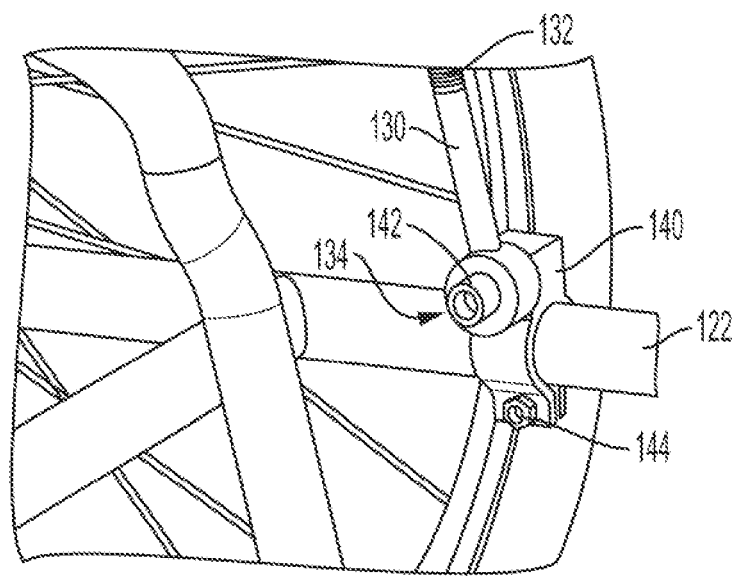
FIG. 4 is another partial perspective view of the wheelchair as in FIG. 1, further illustrating the frame and adjustment hardware.

Referring also to FIGS. 3-4, the frame 102 can comprise an upper portion 120 that is adjustably coupled to a lower portion 122. For example, the upper portion 120 can be raised or lowered with respect to the lower portion 122. The seat 112 can attach to the upper portion 120, and the wheels 104 and casters 106 can attach to the lower portion 122, hi this way, the seat 112 can be adjusted with respect to the floor. For example, the adjustable seat can enable a user to select a maximum height while still allowing the user's legs to fit underneath a ping pong (table tennis) table. A standard table tennis table from the floor to the underside of the table is 28 inches. In some aspects, it can be desirable to be able to position a seat (which can optionally include a cushion that is compressed by the weight of a user) at a height of 21.5 inches, thereby allowing a half inch clearance between a user having six-inch thighs and the underside of the table. In further aspects, the height can be selectable to be between about 17 inches and about 20 inches, or between about 19 inches and about 22 inches, or greater than 22 inches (but less than the height of a ping pong table).

Figure 8A:
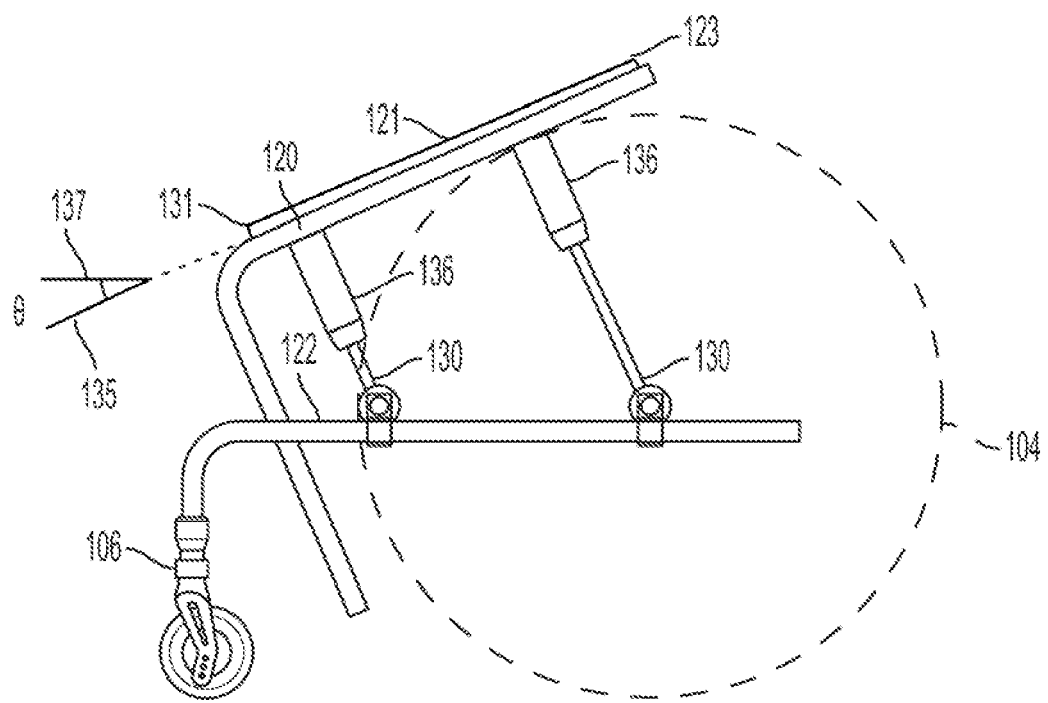
FIG. 8A is a schematic of a portion of the wheelchair as in FIG. 1 in a downwardly angled configuration.
Figure 8B:
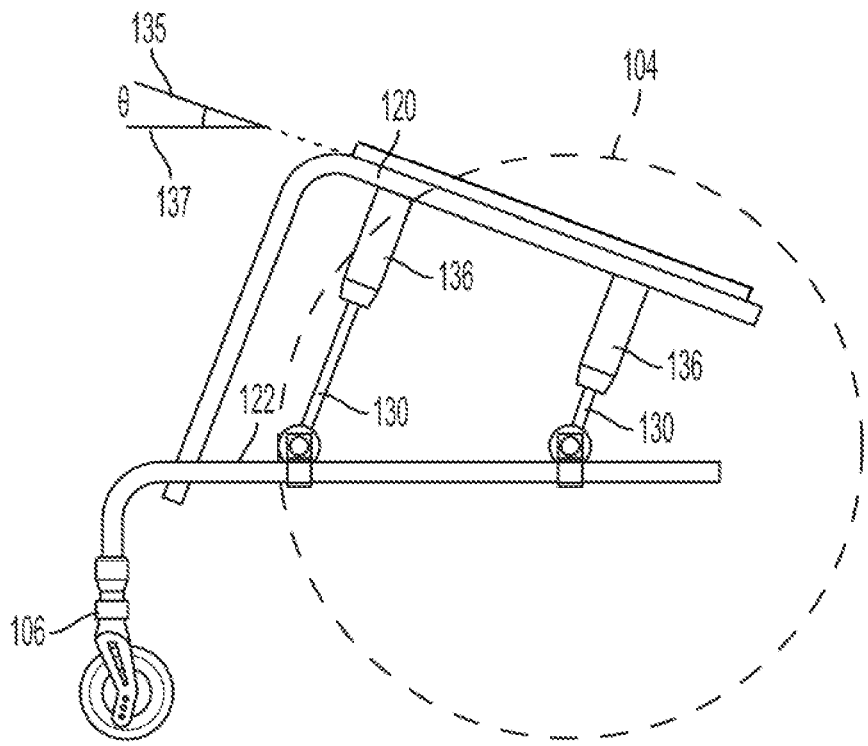
FIG. 8B is a schematic of a portion of the wheelchair as in FIG. 1 in an upwardly angled configuration.

Additionally, referring also to FIGS. 8A-8B, the upper portion 120 of the frame 102 can be angled (optionally, adjustably angled) with respect to the lower portion 122 of the frame (e.g., to orient the seat in an anterior or posterior direction at a select angle θ relative to horizontal). In some aspects, the user can angle the seat at a downward back-to-front slope (anterior tilt, or forward tilt) to increase her vertical reach. That is, the seat 112 can have a front edge 131 and a rear edge 133. The seat 112 can define a tilt axis 135 between the front edge 131 and the rear edge 133 (or otherwise across an upper surface of the seat). As can be understood, the seat 112 and the upper portion 120 of the frame 102 can be coupled so that changes in the tilt axis of the seat can cause corresponding tilting of the upper portion of the frame. Thus, it is contemplated that the orientation of the tilt axis relative to horizontal can correspond to the select angle θ. Optionally, a seatbelt can be included to retain the user in the seat, particularly when the seat is downwardly angled. In some optional aspects, leg straps can couple the legs of the user to the wheelchair. In further aspects, the seat can be angled in an upward back-to-straw slope (posterior tilt, or rearward tilt) to more securely retain the user within the seat. In some aspects, the seat can be angled up to 18 degrees in the downward direction (anterior tilt, or forward tilt, measured relative to a horizontal plane). However, in other aspects, it is contemplated that the seat can be angled greater than 18 degrees in the downward direction (anterior tilt, or forward tilt). For example, in some aspects, the seat can be angled up to 1, 2, 3, 4, 5, 6, 7, 8, 9, 10, 11, 12, 13, 14, 16, 17, 18, 19, 20, 21, 22, 23, 24, or 25 degrees in the downward direction (anterior tilt, or forward tilt). In further aspects, the seat can be angled up to 18 degrees in the upward direction (posterior tilt, or rearward tilt, measured relative to a horizontal plane). However, in other aspects, it is contemplated that the seat can be angled greater than 18 degrees in the upward direction (posterior tilt, or rearward tilt). For example, in some aspects, the seat can be angled up to 1, 2, 3, 4, 5, 6, 7, 8, 9, 10, 11, 12, 13, 14, 15, 16, 17, 18, 19, 20, 21, 22, 23, 24, or 25 degrees in the upward direction. (posterior tilt, or rearward tilt). Thus, it is contemplated that the angle θ can range from about −25 degrees to about 25 degrees.

The frame 102 can be formed of a material that is lightweight and durable. For example, the frame 102 can optionally comprise aluminum tubular members (e.g., one-inch diameter 6160 aluminum tubular members) that can be welded together. The upper portion 120 of the frame 102 can comprise at least one cross bar 121 that extends transversely between the sides of the upper portion of the frame. Likewise, the lower portion 122 of the frame 102 can comprise at least one cross bar 123 that extends transversely between the sides of the lower portion of the frame. The backrest 114 can extend between opposing posts of the frame 102. The backrest 114 can optionally be an ADI backrest (Accessible Designs, Inc., Stealth Products, LLC). Optionally, the backrest 114 can couple to the opposing posts via brackets 125 (e.g., 3D printed brackets).

The frame 102 can comprise a plurality of threaded rod ends that extend between and couple to the upper portion 120 and lower portion 122 of the frame. For example, two front rod ends can extend between the upper portion and the lower portion of the frame on respective sides of the wheelchair 100, and two rear rod ends can extend between the upper and lower portion of the frame on respective sides of the wheelchair. The threaded rod ends 130 can each comprise a threaded shank 132 that defines male threads thereon and an eye 134 that defines a through-hole that is transverse to the axis of elongation of the shank and is configured to receive a bolt or pin therethrough. The threaded rod ends can be, for example, McMaster-Carr part number 6066k440. The rod end can optionally be a rod end bearing (or "Heim joint") comprising a bearing that enables angular variation of the axis of the eye.

The upper portion 120 can comprise a respective tube 136 to receive the shank 132 of each threaded rod end 130. The tube 136 can define female threads that can engage the threads of the shaft 132. For example, a threaded insert can be welded into an interior of each tube 136. In this way, each threaded rod end 130 can be screwed into the tube 136 so that it extends a select distance from the end of the tube. In further optional aspects, a nut 138 (e.g., a flange nut) can be threaded onto the threaded shank 132. The nut 138 can act as a "wedge nut" that is tightened against the tube 136 to inhibit movement between the threaded shank 132 and the tube 136. A plurality of clamps 140 can attach to the lower portion 122 of the frame 102. Each clamp 140 can receive a screw or bolt 142 that extends through the eye 134 of the threaded rod end 130. In this way, the upper portion 120 of the frame can threadedly and adjustably couple to the lower portion 122 of the frame 102.

The screw 1144 (or a bolt and a nut) of the clamp 140 can tighten the clamp against the lower portion 122 of the frame 102 so that the clamp frictionally engages the frame to inhibit sliding therebetween. In some optional aspects, one side of the clamp 140 can define threads, and the screw 144 can thread directly into the threads of the clamp so that the nut can be omitted. The screw 144 (or bolt and nut) can be loosened to allow the clamp 140 to slide along the frame, which can be necessary when adjusting the angle of the seat, as further disclosed herein. Still further, it is contemplated that the clamp 140 can enable adjustment position of the upper portion 120 of the frame 102 relative to the lower portion 122 of the frame along a horizontal axis 145 (FIG. 1) that extends front-to-rear. In this way, the seat position (and, thus, the weight of the user) can be adjusted forwardly and rearwardly relative to the rotational axis 105 of the drive wheels 104. It is contemplated that movement of the seat and user relative to the drive wheels can adjust the maneuverability and balance of the wheelchair. For example, in some aspects, moving the seat forwardly relative to the rotational axis 105 of the drive wheels 104 can improve stability, while moving the seat rearwardly relative to the rotational axis 105 of the drive wheels 104 can improve maneuverability (e.g., pivoting about a vertical axis).

To raise the seat (or the portion of the seat at which the threaded rods attach to adjust the angle of the seat), the threaded rod ends 130 can be decoupled from the bolts 142. The threaded rod ends can then be unscrewed to increase the extent to which the threaded rods extend from their respective tubes 136. The threaded rod ends 130 can be recoupled to the frame via the bolts 142. Likewise, to lower the seat (or the portion of the seat at which the threaded rods attach to adjust the angle of the seat), the threaded rod ends 130 can be decoupled from the bolts 142. The threaded rod ends 130 can then be screwed into the tubes to reduce the extent to which the threaded rods extend from their respective tubes 136.

In order to angle the seat in an upward direction (rearward tilt), it is contemplated that the operative length of the threaded rod ends at the front of frame can be increased (through unscrewing the rod ends to increase the extent to which the rod ends extend from their respective tubes 136), and the operative length of the threaded rod ends at the rear of the frame can be less than the operative length of the threaded rod ends at the front of the frame. Optionally, the operative length of the threaded rod ends at the rear of the frame can remain the same or be decreased relative to an initial length (for example, an initial length setting that is used for each of the threaded rod ends prior to adjustment as disclosed herein).

In order to angle the seat in a downward direction (forward tilt), it is contemplated that the operative length of the threaded rod ends at the rear of frame can be increased (through unscrewing the rod ends to increase the extent to which the rod ends extend from their respective tubes 136, and the operative length of the threaded rod ends at the front of the frame can be less than the operative length of the threaded rod ends at the rear of the frame. Optionally, the operative length of the threaded rod ends at the front of the frame can remain the same or be decreased relative to an initial length (for example, an initial length setting that is used for each of the threaded rod ends prior to adjustment as disclosed herein).

In further optional aspects, it is contemplated that the coupling structure between the upper and lower portions 120, 122 of the frame 102 can be reversed so that the threaded rod ends 130 couple to the upper portion of the frame via clamps 140, and the threaded shanks 132 can thread into respective tubes 136 that are welded or otherwise coupled to the lower portion of the frame.

Figure 5:
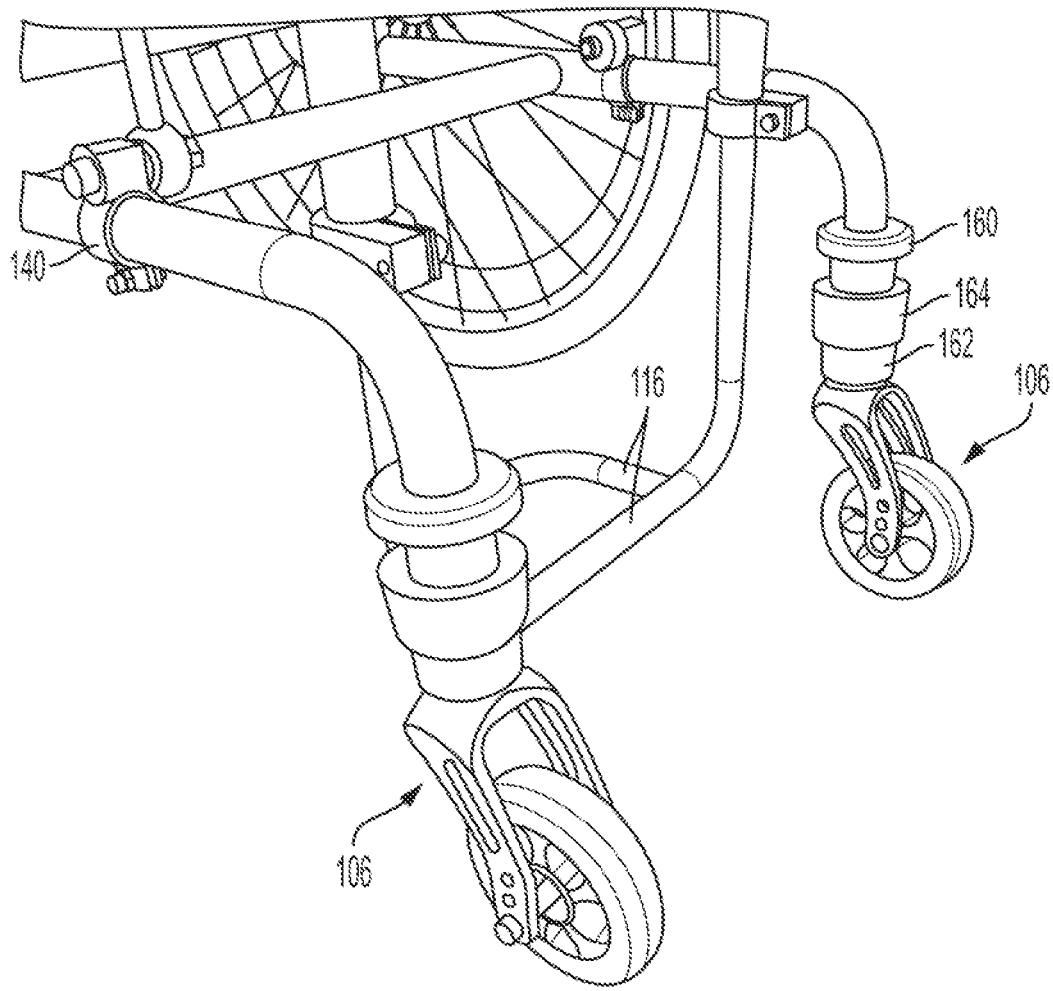
FIG. 5 is a partial perspective view of the wheelchair as in FIG. 1, illustrating locking front casters.
Figure 6:
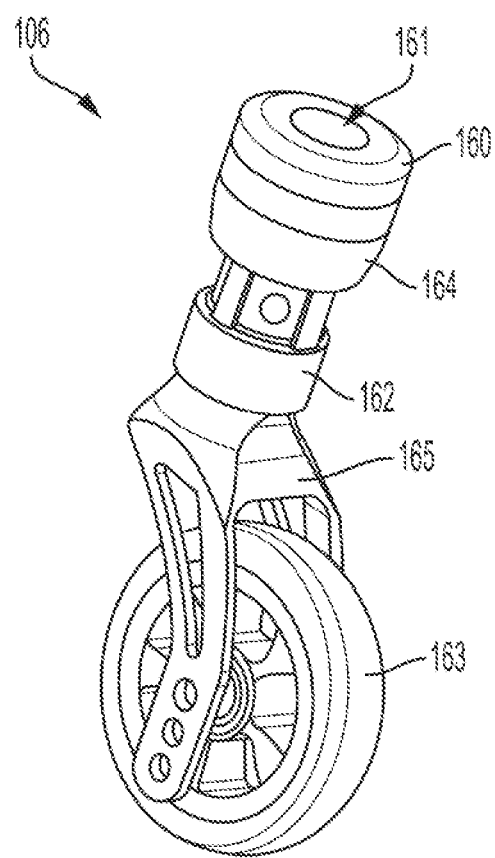
FIG. 6 is a perspective view of one of the casters as in FIG. 5.
Figure 7:
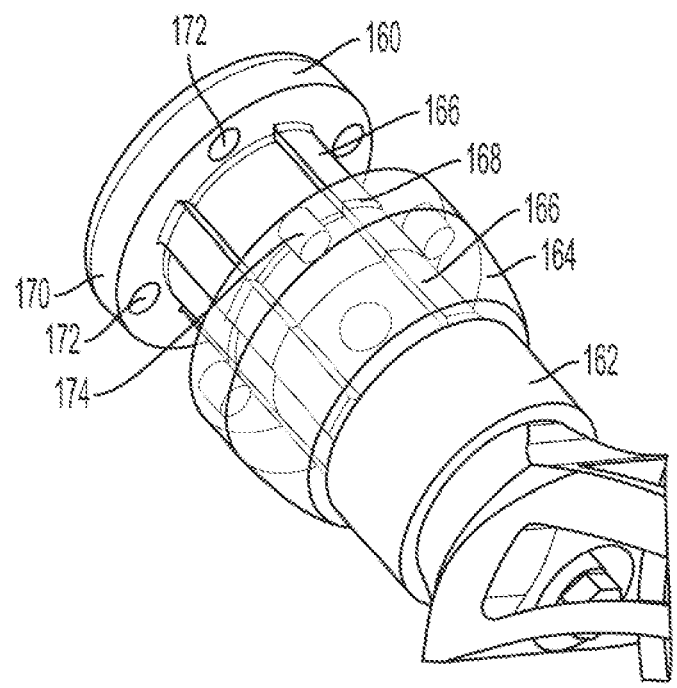
FIG. 7 is a partial perspective view of the caster of FIG. 6, illustrating the locking components of the caster.

Referring to FIGS. 5-7, the casters 106 can be configured to lock to prevent swiveling. For example, the casters can comprise a fixed portion 160 and a swivel portion 162 that is configured to selectively swivel (e.g., rotate) with respect to the fixed portion. A wheel 163 can be rotatably coupled to each swivel portion via a caster fork 165. The caster fork 165 can optionally couple to the swivel portion 162 via a press-fit. The fixed portion 160 of the caster can define a bore 161 that can receive a tubular end portion of the frame. In some optional aspects, each of the fixed portion and the swivel portion can comprise polymer and can optionally be 3D printed. For example, portions of the caster and other portions of the wheelchair can comprise selective laser sintered (SLS) nylon. In further aspects, various components can be formed via injection molding.

Each caster 106 can further comprise a locking collar 164 that is slidable between a locked position (FIG. 7) and an unlocked position (FIG. 6). Each of the fixed portion 160 and the swivel portion 162 can define one or more splines 166 that are complementary to respective grooves 168 in the locking collar 164. When the locking collar 164 is in the unlocked position, the locking collar can be disengaged from the swivel portion 162 so that the swivel portion 162 can swivel with respect to the fixed portion 160. For example, optionally, the locking collar 164 can be shifted axially away tram the swivel portion 162 so that the grooves 168 of the locking collar do not simultaneously engage (a) the splines 166 of the fixed portion 160 and (h) the splines 166 of the swivel portion. When the locking collar 164 is in the locked position, the locking collar 164 can extend (axially) across the fixed portion 160 and the swivel portion 162. In this way, the locking collar 164, via aligned splines 166 of both the swivel portion and the fixed portion and respective grooves 168 that receive corresponding aligned splines, can rotationally couple the swivel portion 162 to the fixed portion 160, thereby inhibiting the swivel portion from swiveling. That is, when a spline of the swivel portion is aligned with a corresponding spline of the fixed portion, it is contemplated that a corresponding groove of the locking collar can receive both of the aligned splines, thereby ensuring rotational coupling of the swivel portion to the fixed portion. Still further, it is contemplated that the locking collar can lock the casters in one or more discrete, predetermined positions (e.g., with the rotational axes of the casters parallel to the axes 105 of the drive wheels 104).

The fixed portion can comprise a flange 170 that houses one or more magnets 172. The locking collar 164 can house one or more magnets 174 that are positioned to attractively engage the magnets 172 to retain the locking collar 164 in the unlocked position. It is further contemplated that either magnet(s) 172 or magnet(s) 174 can be replaced with a ferromagnetic material that is attracted to the other of magnet(s) 172 or magnet(s) 174.

The locking casters 106 can enable a user to use one hand to move the chair in a select direction (or, optionally, along a select arc). For example, a user can select an orientation of the wheelchair with respect to a table tennis table. In some situations, it can be beneficial to be oriented parallel to the longitudinal dimension of the table tennis table. In further situations, it may be beneficial to be oriented at an angle with respect to the longitudinal dimension of the table. After selecting the position and orientation, the user can lock one or both of the casters. Then, because the casters are locked, the user can, with one hand, use a push rim to drive one wheel, thereby driving the wheelchair along a fixed trajectory (e.g., a line). Thus, the user can, for example, quickly move the wheelchair toward and away from the table with one hand while keeping the other hand on the paddle, ready to hit the ball.

It is further contemplated that other mechanisms can be used to selectively lock or unlock the ability of the casters to swivel about their respective swivel axes. For example, the lower portion 122 of the frame 102 can define tubular portions, each having a slot that extends to a lower end of each tubular portion. A caster can have a shaft that is receivable into a respective tubular portion of the frame so that the shaft can pivot within an opening (e.g., a tubular opening defined by the tubular portion of the frame, thereby allowing the caster to swivel with respect to the frame. The frame can further comprise a clamp that can compress the tubular opening at the slot to frictionally engage the shaft of the caster, thereby locking the casters in the locked configuration in which swiveling is inhibited. Further optional caster locking systems, assemblies, and methods, are disclosed in U.S. Patent Publication 2011/0162166 to Cooper et al., filed Nov. 30, 2011, the entirety of which is hereby incorporated by reference herein.

It is contemplated that various other structures can adjustably couple the upper portion of the frame to the lower portion of the frame. For example, the upper portion can be telescopically coupled to the lower portion. In some aspects, the upper portion can comprise a plurality of tubular members that receive corresponding tubular members of the lower portion therein. Respective clamps can lock axial positions between the tubular members of the upper portions and the corresponding tubular members of the lower portions.

Although it is contemplated that the disclosed wheelchair is ideally suited for use during table tennis matches, it is contemplated that the configuration of the disclosed wheelchair can be adjusted for use during any suitable sporting event (game, match, etc.), including, for example, and without limitation, a basketball game, a tennis match, a rugby match, billiards, bocce, archery, shooting, wheelchair dance, and the like. Thus, in some aspects, it is contemplated that a user can use the same wheelchair to compete in a table tennis match and at least one other type of sporting contest, thereby avoiding the need for using multiple adaptive wheelchairs. For example, from a table tennis configuration, the casters can be unlocked, and the seat can be raised and angled with a rear-to-front downward tilt to adapt the wheelchair 100 for use by a basketball forward (i.e., for a user who is playing the "forward" position in a basketball game). In other exemplary aspects, the wheelchair 100 can be adjusted in seat height and/or seat angle, and the casters can optionally be locked or unlocked based on the desired configuration for the given application. It is thus contemplated that the wheelchair 100 can be configured to achieve necessary maximum and minimum seat heights and angular tilts to enable adaptability for other sports and activities.

In further aspects, the chair can be a universal chair that is usable across multiple sports or multiple positions for each sport. For example, for basketball, forwards can use chairs having different heights than those of guards. Typically, forwards have higher chairs to facilitate rebounding, and guards have lower chairs for maneuverability. Thus, embodiments disclosed herein can enable a single chair to be adjustable to be configured for either position. It is further contemplated that other aspects of the chair can be adapted for given applications. For example, it is contemplated that a wheelchair configured for basketball can have the rear wheels adjusted to have a select camber, and guards can be added for protection during collisions.

The following table provides ranges for potential measurements and specifications for the wheelchair 100 based on the user's preferences and abilities.

In use, the wheelchair 100 can enable the user to do some or all of the following:
1. Lock the casters in position to only propel forward or backward;
2. Sit comfortably in the chair throughout the duration of a sporting event (game match, etc.);
3. Propel the wheelchair with one hand;
4. Transfer into and out of the wheelchair independently;
5. Access the push rim of the wheelchair;
6. Maintain a seated position while using the wheelchair in a sporting event (game, match, etc.);
7. Keep the user's legs under a table (during a table tennis match, for example) while seated in an elevated position;
8. Sit in an elevated position for optimal performance in a sporting event (game, match, etc.); and
9. Sit at an optimal angle for reaching the ball while maintaining stability.

Exemplary Configurations for Various Sports/Activities

The following description provides optional configurations for exemplary activities and sports. It is contemplated that the configuration of the wheelchair disclosed herein can be modified to permit a single user to participate in various activities and sports. These configurations are merely examples and are not intended to be limiting. It should be understood that other configurations may also be suitable for use in the sports disclosed herein.

Far a basketball "guard" configuration, the seat can be lowered (e.g., to about 1.8 inches) for maneuverability. The seat can have a posterior tilt (e.g., up to 45 degrees) for stability. The casters can be unlocked. The wheels can have up to 25 degrees of negative camber (optionally, from about 15 degrees to about 25 degrees of camber). As should be understood, camber is a measurement of the rotational axis of the wheels relative to the ground surface. The camber angle is said to be zero when the wheel is perpendicular to the ground and the rotational axis of the wheel is horizontal. The wheel angle is considered negative when it tilts towards the wheelchair at the top. Bumper guards can optionally be added for contact with other wheelchairs. Support straps for the legs and waist can be provided. Anti-tippers can further be included. As are commonly used on wheelchairs, anti-tippers comprise small wheels that are positioned at distal ends of arms. The arms can position the small wheels behind the rear wheels to inhibit the wheelchair from tipping over backwards. In further optional aspects, the anti-tippers can

| | |
|---|---|
| Seat Width | 12", 14", 16", 18", or 20" (range of 12 inches to 20 inches) |
| Seat Depth | 16", 17", 18", 19", 20", 21", or 22" (range of 16 inches to 22 inches) |
| Front seat height | 18", 20", 22", or 24"; with cushion 20", 22", 24", or 26 (range of 18 inches to 24 inches or with cushion from 20 inches to 26 inches) |
| Seat angle | 5, 10, 15, 18, or 20 degree anterior tilt-5, 10, 15, 18, or 20 degree posterior tilt (range of 5 degrees to 20 degrees for anterior tilt and from 5 degrees to 20 degrees for posterior tilt) |
| Frame | Example: Rigid, aluminum Alloy, 1" diameter |
| Back Rest | Example: ADI backrest, 16" height, with backrest tube |
| Seat Upholstery | Example: Tension adjustable by straps |
| Cushion | Example: Varilite Zoid Cushion |
| Front Frame Angle | 80°, 85°, 90°, 95°, or 100° (range from 80 degrees to 100 degrees) |
| Footrests | Height adjustable footrests, with optional footrest straps |
| Front Casters | with caster lock |
| Camber | 0°, 3°, 5°, 7°, 10° (range from 0 degrees to 10 degrees) |
| Wheelchair Weight | Below 30, 25, or 20 lbs. (range from 20 lbs. to 30 lbs, or less) | position the small wheels in front of the front casters to inhibit the wheelchair from tipping over forwards.

For a basketball "forward" configuration, the seat can be raised above the seat height used for a basketball guard configuration. For example, the seat can have a height of up to 25 inches and an anterior tilt of up to 15 degrees. The casters can be unlocked. The wheels can have up to 10 degrees of camber (optionally, from about 5 degrees to about 10 degrees of camber). Bumper guards can optionally be added for contact with other wheelchairs. Support straps for the legs and waist can be provided. Anti-tippers can further be included.

For a rugby configuration, the seat can be lowered e.g., to about 18 inches) for maneuverability. The seat can have a posterior tilt (e.g., up to 45 degrees) for stability. The casters can be unlocked. The wheels can have up to 25 degrees of camber (optionally, from about 15 degrees to about 25 degrees of camber). Bumper guards can optionally be added for contact with other wheelchairs. Support straps for the legs and waist can be provided. Anti-tippers can further be included.

For a tennis configuration, the seat can be lowered (e.g., to about 18 inches) for maneuverability. The seat can have a posterior tilt (e.g., about 5-10 degrees, or up to 45 degrees) for stability. In further aspects, the seat can have anterior tilt (e.g., about 5-10 degrees, or up to 20 degrees) to increase height. The casters can be unlocked. The wheels can have up to 25 degrees of camber (optionally, from about 15 degrees to about 25 degrees of camber). Support straps for the legs and waist can be provided. Anti-tippers can further be included. A handle can be provided for the non-racquet holding arm.

For a billiards configuration, the seat can have a height of about 25 inches. The seat can be angled for comfort. The casters can be locked during shots and unlocked as the player positions herself around the table. Support straps for the user's legs and/or waist can be provided.

For stationary sports (e.g., bocce, archery, and shooting), the seat can have a height of about 25 inches. The angle can be selected based on comfort. The casters can be locked during shooting/throwing. Support straps for the user's legs and/or waist can be provided.

For wheelchair dance, the configuration can depend on the desired aesthetic, and the casters can be unlocked.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A wheelchair comprising: a frame comprising an upper portion and a lower portion that is coupled to the upper portion so that the upper portion is vertically adjustable with respect to the lower portion; a pair of drive wheels coupled to the frame; and a plurality of casters coupled to the frame, wherein each caster has a respective swivel axis, wherein at least one caster of the plurality of casters is configured to be locked to prevent swiveling about its respective swivel axis and unlocked to enable swiveling about its respective swivel axis.

Aspect 2: The wheelchair of aspect 1, wherein the at least one caster comprises: a fixed portion and a swivel portion that is selectively pivotable with respect to the fixed portion about the respective swivel axis, wherein the fixed portion and the swivel portion each define at least one spline; and a locking collar that is slidable along the swivel axis between a first position and a second position, wherein the locking collar defines an internal groove that is configured to receive therein a respective spline of the at least one spline of the fixed portion and a respective spline of the at least one spline of the swivel portion, wherein, when the at least one spline of the swivel portion of the at least one caster is aligned with the internal groove of the locking collar, the locking collar is configured to move from the first position to the second position, wherein, in the second position, the locking collar is configured to inhibit pivoting of the swivel portion of the at least one caster with respect to the fixed portion of the at least one caster.

Aspect 3: The wheelchair of aspect 2, wherein, when in the second position, the locking collar extends across an intersection between the fixed portion and the swivel portion of the at least one caster.

Aspect 4: The wheelchair of aspect 2 or aspect 3, wherein the at least one caster further comprises at least one magnet that is configured to retain the locking collar in at least one of the first position or the second position.

Aspect 5: The wheelchair of aspect 3, wherein the fixed portion of the at least one caster comprises a flange that houses at least one of the at least one magnet.

Aspect 6: The wheelchair of any one of the preceding aspects, wherein the frame comprises at least one threaded rod end extending between the upper portion and the lower portion of the frame, wherein the at least one threaded rod end defines at least one thread and a transverse through-hole, wherein one of the upper portion and the lower portion of the frame defines a female thread that receives the at least one thread of the at least one threaded rod end and the other of the upper portion and the lower portion of the frame couples to the threaded rod end via the transverse through-hole.

Aspect 7: The wheelchair of aspect 6, wherein the at least one threaded rod end comprises four threaded rod ends.

Aspect 8: The wheelchair of aspect 6 or aspect 7, further comprising at least one bolt, wherein a respective bolt of the at least one bolt extends through the transverse through-hole of each one of the at least one rod end and couples to the lower portion of the frame.

Aspect 9: The wheelchair of any one of the preceding aspects, further comprising at least one clamp, wherein a respective clamp of the at least one clamp couples to the lower portion of the frame and receives a respective bolt of the at least one bolt therethrough.

Aspect 10: The wheelchair of any one of the preceding aspects, further comprising a seat coupled to the frame, wherein the upper portion of the frame is adjustable with respect to the lower portion of the frame to position the seat at least 17 inches above the ground.

Aspect 11: The Wheelchair of aspect 10, wherein the wheelchair is configured to position the seat at least 20 inches above the ground.

Aspect 12: The wheelchair of any one of the preceding aspects, further comprising a seat coupled to the frame, wherein the seat defines an angular tilt between the front edge and the rear edge, wherein the wheelchair is configured to enable a forward tilt of at least eighteen degrees.

Aspect 13: The wheelchair of aspect 12, wherein the wheelchair s configured to enable a rearward tilt of at least eighteen degrees.

Aspect 14: The wheelchair of any one of the preceding aspects, further comprising a push rim coupled to the drive wheels so that rotation of the push rim causes corresponding rotation of the drive wheels.

Aspect 15: A wheelchair comprising a frame comprising an upper portion and a lower portion that is coupled to the upper portion so that the upper portion is vertically adjustable with respect to the lower portion; a pair of drive wheels coupled to the frame; and a plurality of casters coupled to the frame, wherein the upper portion of the frame is angularly adjustable with respect to the lower portion of the flame at a selectable anterior-to-posterior tilt.

Aspect 16: The wheelchair of aspect 15, wherein the frame comprises at least one threaded rod end extending between the upper portion and the lower portion of the frame, wherein the at least one threaded rod end defines at least one thread and a transverse through hole, wherein one of the upper portion and the lower portion of the frame defines a female thread that receives the at least one thread of the at least one threaded rod end and the other of the upper portion and the lower portion of the frame couples to the threaded rod end via the transverse through-hole.

Aspect 17: The wheelchair of claim 15, wherein the upper portion of the frame is adjustably coupled to the lower portion of the frame at a selectable position along a horizontal axis extending between a front and a rear of the wheelchair.

Aspect 18: A wheelchair comprising: a frame; a pair of drive wheels coupled to the frame; and a plurality of casters coupled to the frame, wherein each caster has a respective swivel axis, wherein at least one caster of the plurality of casters is configured to be locked to prevent swiveling about its respective swivel axis and unlocked to enable swiveling about its respective swivel axis.

Aspect 19: The wheelchair of aspect 18, wherein the at least one caster comprises: a fixed portion and a swivel portion that is selectively pivotable with respect to the fixed portion about the respective swivel axis, wherein the fixed portion and the swivel portion each define at least one spline; and a locking collar that is slidable along the swivel axis between a first position and a second position, wherein the locking collar defines an internal groove that is configured to receive therein a respective spline of the at least one spline of the fixed portion and a respective spline of the at least one spline of the swivel portion, wherein, when the at least one spline of the swivel portion of the at least one caster is aligned with the internal groove of the locking collar, the locking collar is configured to move from the first position to the second position, wherein, in the second position, the locking collar is configured to inhibit pivoting of the swivel portion of the at least one caster with respect to the fixed portion of the at least one caster.

Aspect 20: The wheelchair of aspect 19, wherein, when in the second position, the locking collar extends across an intersection between the fixed portion and the swivel portion of the at least one caster.

Although the foregoing invention has been described in some detail by way of illustration and example for purposes of clarity of understanding, certain changes and modifications may be practiced within the scope of the appended claims.

What is claimed is:

1. A wheelchair comprising:
   a frame comprising an upper portion and a lower portion that is coupled to the upper portion so that the upper portion is vertically adjustable with respect to the lower portion;
   a pair of drive wheels coupled to the lower portion of the frame; and
   a plurality of casters coupled to the lower portion of the frame, wherein each caster has a respective swivel axis, wherein at least one caster of the plurality of casters is configured to be locked to prevent swiveling about its respective swivel axis and unlocked to enable swiveling about its respective swivel axis.

2. The wheelchair of claim 1, wherein the at least one caster comprises:
   a fixed portion and a swivel portion that is selectively pivotable with respect to the fixed portion about the respective swivel axis, wherein the fixed portion and the swivel portion each define at least one spline; and
   a locking collar that is slidable along the swivel axis between a first position and a second position, wherein the locking collar defines an internal groove that is configured to receive therein a respective spline of the at least one spline of the fixed portion and a respective spline of the at least one spline of the swivel portion, wherein, when the at least one spline of the swivel portion of the at least one caster is aligned with the internal groove of the locking collar, the locking collar is configured to move from the first position to the second position, wherein, in the second position, the locking collar is configured to inhibit pivoting of the swivel portion of the at least one caster with respect to the fixed portion of the at least one caster.

3. The wheelchair of claim 2, wherein, when in the second position, the locking collar extends across an intersection between the fixed portion and the swivel portion of the at least one caster.

4. The wheelchair of claim 2, wherein the at least one caster further comprises at least one magnet that is configured to retain the locking collar in at least one of the first position or the second position.

5. The wheelchair of claim 3, wherein the fixed portion of the at least one caster comprises a flange that houses at least one of the at least one magnet.

6. The wheelchair of claim 1, wherein the frame comprises at least one threaded rod end extending between the upper portion and the lower portion of the frame, wherein the at least one threaded rod end defines at least one thread and a transverse through-hole, wherein one of the upper portion and the lower portion of the frame defines a female thread that receives the at least one thread of the at least one threaded rod end and the other of the upper portion and the lower portion of the frame couples to the threaded rod end via the transverse through-hole.

7. The wheelchair of claim 6, wherein the at least one threaded rod end comprises four threaded rod ends.

8. The wheelchair of claim 6, further comprising at least one bolt, wherein a respective bolt of the at least one bolt extends through the transverse through-hole of each one of the at least one rod end and couples to the lower portion of the frame.

9. The wheelchair of claim 8, further comprising at least one clamp, wherein a respective clamp of the at least one clamp couples to the lower portion of the frame and receives a respective bolt of the at least one bolt therethrough.

10. The wheelchair of claim 1, further comprising a seat coupled to the frame, wherein the upper portion of the frame is adjustable with respect to the lower portion of the frame to position the seat at least 17 inches above the ground.

11. The wheelchair of claim 10, wherein the wheelchair is configured to position the seat at least 20 inches above the ground.

12. The wheelchair of claim 1, further comprising a seat coupled to the frame, wherein the seat defines an angular tilt between the front edge and the rear edge, wherein the wheelchair is configured to enable a forward tilt of at least eighteen degrees.

13. The wheelchair of claim 12, wherein the wheelchair is configured to enable a rearward tilt of at least eighteen degrees.

14. The wheelchair of claim 1, wherein the upper portion of the frame is adjustably coupled to the lower portion of the frame at a selectable position along a horizontal axis extending between a front and a rear of the wheelchair.

15. A wheelchair comprising:
   a frame comprising an upper portion and a lower portion that is coupled to the upper portion so that the upper portion is vertically adjustable with respect to the lower portion, wherein the upper portion of the frame is angularly adjustable with respect to the lower portion of the frame at a selectable anterior-to-posterior tilt;
   a pair of drive wheels coupled to the lower portion of the frame; and
   a plurality of casters coupled to the lower portion of the frame.

16. The wheelchair of claim 15, wherein the frame comprises at least one threaded rod end extending between the upper portion and the lower portion of the frame, wherein the at least one threaded rod end defines at least one thread and a transverse through-hole, wherein one of the upper portion and the lower portion of the frame defines a female thread that receives the at least one thread of the at least one threaded rod end and the other of the upper portion and the lower portion of the frame couples to the threaded rod end via the transverse through-hole.

17. The wheelchair of claim 15, wherein the upper portion of the frame is adjustably coupled to the lower portion of the frame at a selectable position along a horizontal axis extending between a front and a rear of the wheelchair.

18. A wheelchair comprising:
   a frame;
   a pair of drive wheels coupled to the frame; and
   a plurality of casters coupled to the frame, wherein each caster has a respective swivel axis, wherein at least one caster of the plurality of casters is configured to be locked to prevent swiveling about its respective swivel axis and unlocked to enable swiveling about its respective swivel axis,
   wherein the at least one caster of the plurality of casters comprises:
      a fixed portion and a swivel portion that is selectively pivotable with respect to the fixed portion about the respective swivel axis, wherein the fixed portion and the swivel portion each define at least one spline; and
      a locking collar that is slidable along the swivel axis between a first position and a second position, wherein the locking collar defines an internal groove that is configured to receive therein a respective spline of the at least one spline of the fixed portion and a respective spline of the at least one spline of the swivel portion, wherein, when the at least one spline of the swivel portion of the at least one caster is aligned with the internal groove of the locking collar, the locking collar is configured to move from the first position to the second position, wherein, in the second position, the locking collar is configured to inhibit pivoting of the swivel portion of the at least one caster with respect to the fixed portion of the at least one caster.

19. The wheelchair of claim 18, wherein, when in the second position, the locking collar extends across an intersection between the fixed portion and the swivel portion of the at least one caster.

* * * * *